United States Patent [19]
Baumann

[11] Patent Number: 5,538,626
[45] Date of Patent: Jul. 23, 1996

[54] LIQUID FILTER

[75] Inventor: Dieter Baumann, Greven, Germany

[73] Assignee: Ing, Walter Hengst GmbH & Co. KG, Muenster, Germany

[21] Appl. No.: 275,982

[22] Filed: Jul. 15, 1994

[51] Int. Cl.[6] ................................................ B01D 35/02
[52] U.S. Cl. ........................ 210/130; 210/136; 210/186; 210/232; 210/248; 210/440; 210/441; 210/450
[58] Field of Search ................................. 210/248, 437, 210/440, 441, DIG. 17, 232, 450, 130, 136, 186; 123/196 A

[56] References Cited

U.S. PATENT DOCUMENTS

| | | | |
|---|---|---|---|
| 3,069,015 | 12/1962 | Hultgren et al. | 210/232 |
| 3,773,180 | 11/1973 | Harrison | 210/315 |
| 5,374,355 | 12/1994 | Habiger et al. | 210/440 |

FOREIGN PATENT DOCUMENTS

| | | | |
|---|---|---|---|
| 3820675 | 12/1989 | Germany | 123/196 A |
| 4036191A1 | 2/1992 | Germany . | |
| 4131353 | 10/1992 | Germany | 210/440 |
| 4201041A1 | 7/1993 | Germany . | |
| 4240656A1 | 7/1993 | Germany . | |

Primary Examiner—Matthew O. Savage
Attorney, Agent, or Firm—Hill, Steadman & Simpson

[57] ABSTRACT

In a liquid filter comprising a filter housing having at least one liquid intake channel and at least one liquid return channel passing through a face wall of the filter housing that faces toward a filter connecting flange to which said filter housing is to be mounted, a releasable cover that closes the filter housing liquid-tight, an individually replaceable filter insert that can removed from the filter housing, and the improvement of a hollow fastening screw forming an axial liquid channel in communication with the liquid return channel and that can be rotated relative to the filter housing, the screw being centrally arranged in the face wall of the filter housing and serving to securely mount the filter housing to the filter connecting flange. Check valves can optionally be provided in the intake channel and in the hollow screw to prevent unwanted flow of liquid through the filter housing, particularly when changing the filter insert. Also, a bypass valve and a bypass filter may be provided to provide for liquid flow through the filter housing when the filter insert prevents sufficient passage of liquid therethrough resulting in an increased pressure across the filter insert.

19 Claims, 5 Drawing Sheets

LIQUID FILTER

BACKGROUND OF THE INVENTION

The invention is directed to a liquid filter, particularly for oil or fuel of an internal combustion engine, whereby the liquid filter comprises a filter housing having at least one respective liquid intake channel and liquid return channel, a detachable cover that closes the filter housing liquid-tight, and a filter insert that can be removed from the filter housing and can be individually replaced, and whereby the liquid filter can be screwed to a filter connecting flange of, for example, an internal combustion engine in sealing fashion instead of a screw-on replaceable filter that can only be replaced as a complete unit.

Screw-on replaceable filters are known and widespread and have been utilized for many years, particularly in connection with the internal combustion engines of motor vehicles. What has proven disadvantageous a bout these screw-on replacement filters is that the complete replacement filter must be disposed of with every replacement, this leading to substantial quantities of waste and to a great waste of material.

In order to alleviate these disadvantages, different liquid filters have already been proposed for a refitting or after-fitting as replacement for traditional screw-on replacement filters, whereby only a filter insert need be replaced and the remaining part of the liquid filter is re-employable.

A first liquid filter of the type first described above is disclosed by DE 40 36 191 A1. Given this known filter, the complete filter is first unscrewed from the appertaining internal combustion engine for a replacement of the filter insert. Subsequently, the filter housing can be opened and the used filter cartridge can be removed and be replaced by a new filter cartridge. After this, the filter housing is reassembled or, respectively, closed again and is then screwed back onto the internal combustion engine. For connecting this filter to the internal combustion engine, the filter housing comprises a head plate at the face side that is implemented of one piece with a central arbor having an inside thread. This arbor having the inside thread can be screwed onto a mating connector element with outside thread at the internal combustion engine, whereby the required flow connections between the internal combustion engine and filter, while being sealed from the outside, are produced at the same time.

What is considered disadvantageous in this known filter is that a high disassembly and assembly outlay is required for changing the filter cartridge, this leading to a high time outlay and to an increased risk of assembly errors.

Another liquid filter of the type first described is disclosed by DE 42 01 041 A1. A filter housing is provided in this filter that is formed of one piece with a wall of the face side and with a tubular connecting piece with inside thread that is centrally arranged therein and projects into the inside of the filter. The filter housing can be closed at its other end with a screw-on cover, whereby the screw-on cover can be unscrewed from the filter housing for the purpose of replacing the filter insert. The filter housing can thereby remain at the motor block of the internal combustion engine.

Finally, DE 42 40 656 A1 discloses a filter that likewise comprises a base plate at the face side that has an attachment with inside thread that is formed of one piece therewith and points toward the inside into the filter housing. Here, too, a cover of the filter housing can be screwed off for the purpose of replacing the filter insert. A drain plug is also provided in the center of the cover given this known filter, this serving the purpose of draining the filter housing before a replacement of the filter insert. This draining, however, disadvantageously only functions when the filter is built in "hanging", i.e. having an essentially vertical longitudinal axis with the cover pointing in downward direction. Given a horizonal installed attitude, for example, the filter housing can be at most approximately half empty given such a drain plug.

Further, all known filters set forth above have the disadvantage that their ultimate position, viewed in circumferential direction in their screwed-on condition, is completely arbitrary, since this defined only by the relative position of the threads of the inside and the outside threads of the screw-type connection. As a result thereof, for example, filter housings cannot be employed that have their circumference equipped with a drain opening for emptying the filter housing, since it cannot be assured that the drain opening, given a horizonal or approximately horizontal arrangement of the filter, in fact points downward or at least approximately downward in the screwed-on condition of the filter.

Finally, it is also to be considered disadvantageous that the seal ring arranged between filter housing and filter connecting flange in all known filters of the type first described, wherein the filter housing can be turned as a unit for being screwed to the filter connecting flange, is subjected to substantial stresses in circumferential direction. Even given a careful mounting and prior oiling or lubricating of the seal ring, it can easily occur that the seal ring is distorted or is displaced out of its intended position when the filter housing is screwed on, this involving a relatively high risk of leaks that arise either due to the incorrect position of the seal ring or due to damage thereof during the screw-on event.

The need therefore arises of creating a liquid filter of the type first described that avoids the disadvantages recited above and whereby a freely selectable position in the screwed-on condition is assured as viewed in circumferential direction and whereby the risk of leaks is reduced.

SUMMARY OF THE INVENTION

This need is successfully met by the invention by a liquid filter of the type first described which is characterized in that a hollow fastening screw that forms an axial fluid channel and that is rotatable relative to the filter housing is arranged centrally in that face wall of the filter housing facing toward the filter connecting flange in the mounted condition.

What is achieved as a result of the inventively provided, turnable arrangement of the fastening screw, is that only the fastening screw, but not the filter housing itself, need be turned for connecting the filter housing to the appertaining filter connecting flange. As a result thereof, the filter housing can be brought into any desired position in circumferential direction and can be fixed in this position that is advantageous or required, for example for operational reasons. Since the seal between filter connecting flange and filter housing is not thereby stressed in circumferential direction, leaks as a consequence of an improper position of the seal or premature damage during the attachment of the filter housing to the filter connection flange are practically precluded.

It is preferably provided for simplifying the attachment of the liquid filter to the filter connecting flange that the fastening screw is held captive in the face wall of the filter housing. The attachment of the filter housing can thus ensue without difficulty even given a "hanging" installing of the liquid filter, since it is adequate to hold the filter housing at the outside and to then turn the fastening screw held in the face wall of the filter housing.

In order to be able to use standard screwing tools for attaching the liquid filter, it is preferably provided that the fastening screw comprises an inside and/or outside polygon as a screwing tool dog point at its end directed towards the cover. The use of special tools such as, for example, strap wrenches or wrenches with extreme sizes is thereby avoided.

It is also preferably provided that an annular channel for the acceptance of a seal ring is provided radially outward in that surface of the face wall of the filter housing facing toward the filter connecting flange, whereby the seal ring projects from the channel in axial direction of the filter housing in the relaxed condition of the seal ring and whereby the seal ring lies completely inside the annular channel upon elastic deformation in the mounted condition of the liquid filter. What is thus achieved is that those surfaces of the filter connecting flange and the face wall of the filter housing facing toward one another press directly against one another when the fastening screw is tightly screwed, so that high reliability against unintentional unscrewing of the filter housing or, respectively, of the fastening screw is achieved. At the same time, the seal ring is mechanically relieved, so that the seal ring achieves a long service life without the reliability of its sealing effect being deteriorated.

A further preferred development of the liquid filter is characterized in that a liquid drain opening for emptying the filter housing, that is closed during operation and can be released as needed, is provided at the circumferential side in the filter housing and/or at the circumferential or end side in the cover. As a result of the afore-mentioned, free capability of positioning the filter housing in terms of its circumferential direction, a liquid drain opening provided at the circumferential side in the filter housing can be positioned such, without further ado, that it is directed down in the mounted condition of the filter housing in order to assure a practically complete draining of the filter housing when the liquid drain opening is opened. An uncontrolled emergence of liquid, for example of oil or fuel, is thereby avoided when replacing a filter insert. However, the removed filter insert only contains slight residual quantities of liquid, as a result whereof a further contribution against environmental pollution is performed with this feature. The same advantages derive given a filter housing that is arranged in vertical direction, whereby the cover is then directed downward, so that a complete draining of the filter housing is possible through the liquid drain opening provided in the cover.

The liquid drain opening is preferably formed by a clearance or threaded bore that can be closed with a releasable screw, as a result whereof a simple manufacture of the filter and a simple servicing are assured.

In order to prevent the filter from emptying during non-operation, for example given standstill of an appertaining internal combustion engine, and in order to prevent filtered liquid, for example oil from an internal combustion engine, from emerging toward the outside when the filter housing is open, it is proposed that a check valve is arranged in the axial liquid channel in the fastening screw, i.e. at the crude (unfiltered) side.

In order to achieve the same double purpose but at the crude side here, a check diaphragm that lies between the intake channel and filter insert in the flow path of the liquid to be filtered is provided at the side of the filter housing at the face wall of the filter housing.

The check diaphragm is preferably flexibly and annularly fashioned and is held at its radially inner edge between the face wall and a collar provided at the fastening screw. A simple manufacture of the check diaphragm and a mounting of the check diaphragm that can be implemented with little outlay are thereby achieved.

A further development of the liquid filter provides that the fastening screw projects into the filter housing at least over a part of the axial length of the filter housing and comprises supporting elements at its outside circumference for a fold support at the inside circumference of a hollow-cylindrical star-shaped filter insert, folded zig zag-like, that is arranged in the filter housing as a filter insert. What is thereby achieved is that the filter insert does not collapse even given high differences in pressure between the crude side and the clean side of the filter. The fastening screw is thereby expediently implemented with a relatively great axial length, so that access to the screwing tool dog point provided at its free end is facilitated.

In order to also be able to support the region of the inside circumference of the filter insert, this not lying in the region of the fastening screw, it is proposed that the cover is connected to a supporting member—aligning with the fastening screw—for a fold support at the inside circumference of a hollow-cylindrical star-shaped filter insert, folded zig zag-shaped, that is arranged in the filter housing as a filter insert or that the cover is implemented of one piece with said supporting member.

A development of this last-explained embodiment of the liquid filter proposes that a bypass valve is provided in the supporting member, to allow for a direct flow path from the crude side to the clean side while bypassing the filter insert, the flow path being opened by the bypass valve given upward transgression of a prescribable pressure differential between crude side and clean side of the liquid filter. What is assured in this way is that a passage of liquid through the filter is at least still possible when the filter insert has become unpenetratable in order, for example, to continue to enable the fuel supply or lubricant supply of an internal combustion engine.

In order to assure at least a certain filtering of the liquid flowing through the filter in this last-described instance, it is proposed that a bypass filter element is arranged in the course of the direct flow path from the crude side to the clean side of the filter. As a result thereof, coarse contaminants of the liquid flowing through the filter are still intercepted, as a result whereof serious damage to an appertaining internal combustion engine can be avoided under certain circumstances.

For facilitating the replacement of the filter insert, it is proposed that the cover and the filter insert are equipped with snap-in connector means that can be brought into engagement with one another. The provision of such snap-in connector means assures that the filter insert is removed from the housing by the cover when the cover is taken off from the filter housing. After the filter insert is removed from the filter housing by releasing the cover, the snap-in connector between the filter insert and cover can then be unproblematicaly released and a new filter insert can then be latched to the cover and can in turn be installed into the filter housing in the reverse order, in that the cover is again joined to the filter housing, for example screwed thereto.

It is also preferably provided that the supporting member is also joined to the cover in a clamping or latching fashion and that the bypass valve potentially provided in the supporting member is also formed as a structural unit that can be joined, preferably latched, to the supporting member. Additionally, the bypass filter element that is optionally provided can also be already held at the cover, so that a large structural unit composed of cover, supporting member, bypass valve, bypass filter element and filter insert can be formed. This substantially simplifies the mounting and servicing of the liquid filter of the invention.

It is meaningful or necessary in many instances to also cool or heat the liquid to be filtered, to which end a heat exchanger is to be provided next to the filter. The liquid filter of the invention offers the possibility here of an integrated fashioning of the heat exchanger.

A first solution with respect thereto proposes that the filter housing comprises liquid channels and a connecting flange for a heat exchanger through which the liquid to be filtered or the filtered liquid can flow and that is flanged to the filter housing directed in radial direction thereof. In conjunction with the above-explained, free positionability of the filter housing in terms of its circumferential direction, the possibility is thus available of also arranging the heat exchanger at any desired position in circumferential direction of the liquid filter that corresponds to the installation conditions. As a result thereof, the heat exchanger and liquid filter can be combined given good exploitation of the space even under constricted conditions as, for example, frequently occur in the engine compartment of motor vehicles.

An alternative solution with respect to the heat exchanger proposes that the filter housing is fashioned of one piece with a heat exchanger housing directed in radial direction of the filter housing for accepting a heat exchanger through which the liquid to be filtered or the filtered liquid can flow. Given this embodiment, the heat exchanger can then be introduced into the heat exchanger housing fashioned of one piece with the filter housing. For purposes of sealing, a separate cover that closes the heat exchanger housing or a cover piece joined to the heat exchanger or fashioned of one piece therewith is then expediently provided. Here, too, there is the advantage that the heat exchanger housing can be positioned pointing in any desired direction by turning the filter housing relative to the filter connecting flange.

The filter housing is preferably a light metal diecast part, for example of an aluminum or magnesium alloy. The cover serving the purpose of closing the filter housing can optionally be an injection molded plastic part or can likewise be a light metal diecast part. Due to the mechanical stresses that the fastening screw must absorb, this is preferably a steel part that is processed by a machining. The various seal rings as well as the check diaphragm are preferably elastomer parts, as is standard. The supporting member and the bypass valve, optionally fashioned integrated therewith, are likewise preferably injection molded plastic parts. This is also true of the check valve optionally provided in the fastening screw. As already mentioned above, the filter insert is advantageously composed of materials that allow a complete thermal processing after being used, for example of filter paper for the filter member and of plastic, for example polyamide, for the face disks and felt or rubber for the seals at the face disks.

BRIEF DESCRIPTION OF THE DRAWINGS

Exemplary embodiments of the invention are set forth below with reference to a drawing. The figures of the drawing show.

DETAILED DESCRIPTION OF THE PREFERRED EMBODIMENTS

Figure 1:
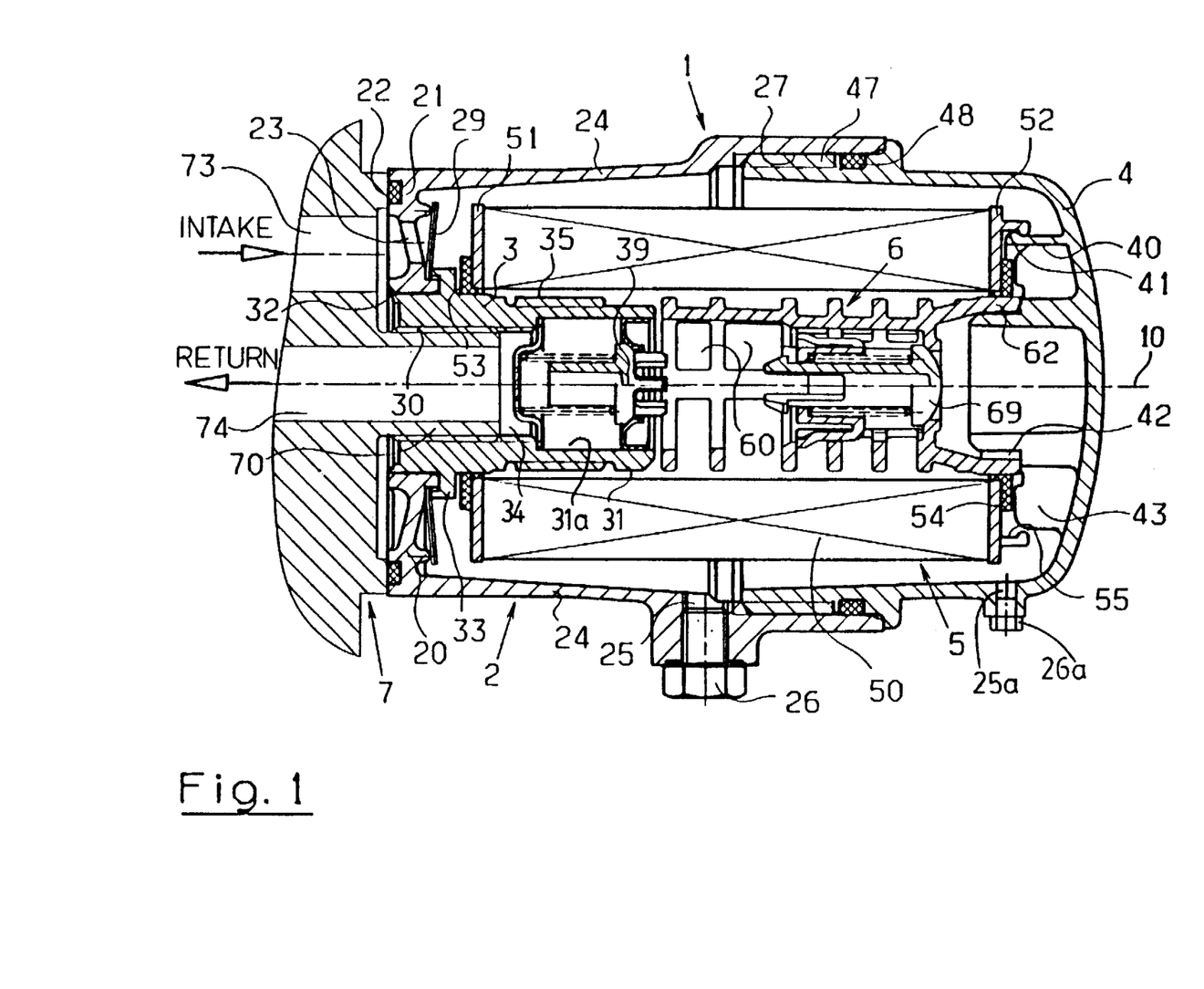
FIG. 1 is a longitudinal sectional view of a liquid filter shown in a horizontal installed attitude.

As a first exemplary embodiment of a liquid filter 1, FIG. 1 of the drawing shows an embodiment for a horizontal or lying installation, i.e. with a longitudinal axis 10 that proceeds essentially horizontally. The liquid filter 1 has an essentially cup-shaped filter housing 2 that is formed by a face wall 20 and a circumferential wall 24, preferably as a light metal die cast part. At its outside, i.e. at the side directed towards the left in the drawing, the face wall 20 carries an annular channel 21 in which a seal ring 22 made of an elastomer is arranged. An intake channel 23 follows inwardly in radial direction, whereby a plurality of such intake channels 23 are usually provided distributed over the circumference of the face wall 20. A central fastening screw 3, that is fashioned with an inside thread 30, is arranged in turnable fashion in the center of the face wall 20. The fastening screw 3 is supported at the inside at the face wall 20 with a collar 33.

The left-hand part of FIG. 1 shows a filter connecting flange 7 that, for example, is part of the engine block of an internal combustion engine. An intake channel 73 lies in the upper part of the filter connecting flange 7, liquid to be filtered proceeding through this intake channel 73 to the intake channel 23 within the face wall 20 of the liquid filter 1. A return channel 74 that proceeds through a threaded connector 70 having an outside thread that projects from the surface of the filter connecting flange 7 may be seen under the intake channel 73. The fastening screw 3 is screwed onto the threaded connector 70, as a result whereof the filter housing 2 has its face wall 20 and the seal ring 22 pressed against the filter connecting flange 7 in sealing fashion.

In order to hold the fastening screw 3 at the face wall 20 of the filter housing 2 in captive fashion without impeding its turnability, the fastening screw 3 has its outside provided with a flared flange 32 that precludes a retraction of the fastening screw 3 into the inside of the filter housing 2, i.e. towards the right in the drawing.

The filter housing 2 is fashioned open at its side pointing towards the right and has an inside thread 27 at the inside of its circumferential wall 24. A cover 4 can be screwed in sealing fashion into this inside thread 27 with a mating outside thread 47 upon interposition of a further seal ring 48.

Further, a filter insert 5 is arranged in the inside of the liquid filter 1; this filter insert 5 is composed of a zigzag-shaped, folded member 50 of filter material that is joined liquid-tight, for example, glued or bonded, to a respective face disk 51, 52 at the top and bottom. Both face disks 51, 52 are annularly fashioned and each carry a seal 53, 54 at their radially inside edge. The left-hand face disk 51 in the drawing is plugged in sealing fashion onto the outside circumference of the fastening screw 3 at the collar 33 upon interposition of the appertaining seal 53.

The face disk 52 of the filter insert 5 at the right-hand side in the drawing is provided with catch receptacles 55 projecting toward the free side that collaborate with catch noses 41 that are attached to catch tongues 40 of the cover 4. A snap-in connection between the filter insert 5 and the cover 4 can be produced as a result thereof.

A central supporting member 6, which has an essentially hollow-cylindrical, lattice-like structure and serves the purpose of supporting the inside circumference of the member 50 of filter material is also joined to the cover 4. The passages 60 in the supporting member 6 enable a practically unimpeded passage of liquid. The supporting member 6 has its end 62 at the cover side attached to the cover 4 in clamping or latching fashion, to which end the cover 4 comprises a receptacle 42 for the supporting member at its inside. The right-hand face disk 52 of the filter insert 5 is put in place in sealing fashion with its seal 54 engaging this end 62 at the cover side.

As may be seen from the drawing, the supporting member 6 extends over approximately two-thirds of the length of the filter insert 5 as viewed proceeding from the cover; the remaining part of the hollow interior of the filter insert 5 is occupied here by the fastening screw 3. So that the latter can also exercise a supporting function for the member 50 of filter material, the fastening screw 3 has that part lying in the interior of the filter insert 5 formed with supporting members 35 that have the shape of projecting ribs or ridges that proceed in longitudinal direction of the fastening screw 3.

At its free end directed toward the supporting member 6, the fastening screw 3 also carries an outside polygon 31 or an inside polygon 31a, for example, a hexagon, that serves the purpose of receiving a screwing tool.

The exemplary embodiment of the liquid filter 1 shown here also comprises a check diaphragm 29 that is arranged at the inner side of the face wall 20 and covers the intake channel 23. When liquid to be filtered is conveyed in intake direction through the intake channel 73 in the filter connecting flange 7, and is conveyed further through the intake channel 23 in the face wall 20, the check diaphragm 29 is opened and allows the liquid to pass. A flow in the opposite flow direction is prevented by the check diaphragm 29.

In this exemplary embodiment, a check valve 39 is also arranged in the right-hand part of the fastening screw 3, this check valve 39 being pressed or glued into the hollow inside of the fastening screw 3 as a prefabricated part. The check valve 39 thus lies in the return channel 34 for the filtered liquid formed by the hollow fastening screw 3.

A further valve is provided inside the supporting member 6, whereby this is a matter of a bypass valve 69 that releases a direct flow connection between the intake or crude side and the return or clean side of the liquid filter 1 when the pressure difference over the filter insert 5 exceeds a limit value. The bypass valve 69 is also introduced into the supporting member 6 as a prefabricated part from the free end and is latched therein.

Finally, the illustrated exemplary embodiment of the liquid filter 1 of FIG. 1 has a drain opening 25 in the circumferential wall of the filter housing 2 that is normally tightly closed by a screw 26. For draining the liquid filter 1, particularly for the purpose of changing the filter insert 5, the screw 26 can be unscrewed from the drain opening 25, whereupon liquid situated in the liquid filter 1 can drain off through the drain opening 25 and, for example, can be collected in a container provided for that purpose. Alternately, a drain opening 25a can be provided in a circumferential side of the cover 4 that is normally closed by a screw 26a (see FIG. 1).

As already set forth earlier, the liquid filter 1 is particularly suitable for replacing screw-on replacement filters that can only be replaced as a complete unit. Upon initial mounting of the liquid filter 1, the filter housing 2 is first positioned in front of the filter connecting flange 7 and is subsequently braced against the filter connecting flange 7 by turning the fastening screw 3. As a consequence of the turnability of the fastening screw 3 relative to the filter housing 2, only the fastening screw 3 is turned during installation, whereas the filter housing 2 need not be moved in circumferential direction. As a result thereof, the seal ring 22 at the face wall 20 of the filter housing 2 is also not stressed in circumferential direction, this assuring that no leaks as a consequence of a dislocation or distortion of the seal ring 22 occur here. Further, a metallic surface of the face wall 20 lies against what is likewise usually the metallic surface of the filter connecting flange 7, so that a high reliability against unscrewing is assured in the screwed together condition. Due to the turnability of the fastening screw 3 relative to the filter housing 2, the drain opening 25 shown in FIG. 1 can also be positioned in the desired position at the same time, particularly directed downward, regardless of how the thread in the threaded connector 70 of the filter connecting flange 7 proceeds.

During operation of the liquid filter 1, the liquid to be filtered from, for example, an internal combustion engine, flows through the intake channel 73 and, further, through the intake channel 23 via the check diaphragm 29 into the interior of the filter housing 2. The liquid to be filtered proceeds therein to the outside circumference of the filter insert 5 and flows through the latter from outside to inside resulting in the separation of contaminants from the liquid. In the inside of the filter insert 5, the liquid which has now been filtered flows through the passages 60 of the supporting member 6 and subsequently flows through the check valve 39 in opening direction. The filtered liquid, further, flows through the return channel 34 formed by the hollow interior of the fastening screw 3 and into the return channel 74 present in the filter connecting flange 7.

In case of great contamination and blockage of the filter insert 5, the liquid can flow from the outside circumference of the filter insert 5 along the inside of the cover 4 and can flow, via passages 43 to the bypass valve 69 that opens after a certain pressure differential between the area inside of the cover 4 and the return channel 34, directly to the return channel 34 and, further, to the return channel 74.

For changing the filter insert 5, as is required after a certain service time, the cover 4, given the liquid filter 1, must merely be unscrewed at the interface of threads 27 and 47, preferably following a draining of the liquid from the liquid filter 1 through the drain opening 25. When the cover 4 is unscrewed, the filter insert 5 and the supporting member 6 are moved out of the filter housing 2 at the same time. After removing the used filter insert 5 from the cover 4 and placing a new filter insert 5 onto the cover 4, the assembly of the liquid filter 1 can ensue in a way that is just as simple by screwing the cover 4 back onto the filter housing 2. The filter insert 5, which is now the only part to be replaced for filter servicing, is preferably composed of material that allows an unproblematical, complete thermal processing.

Figure 2:
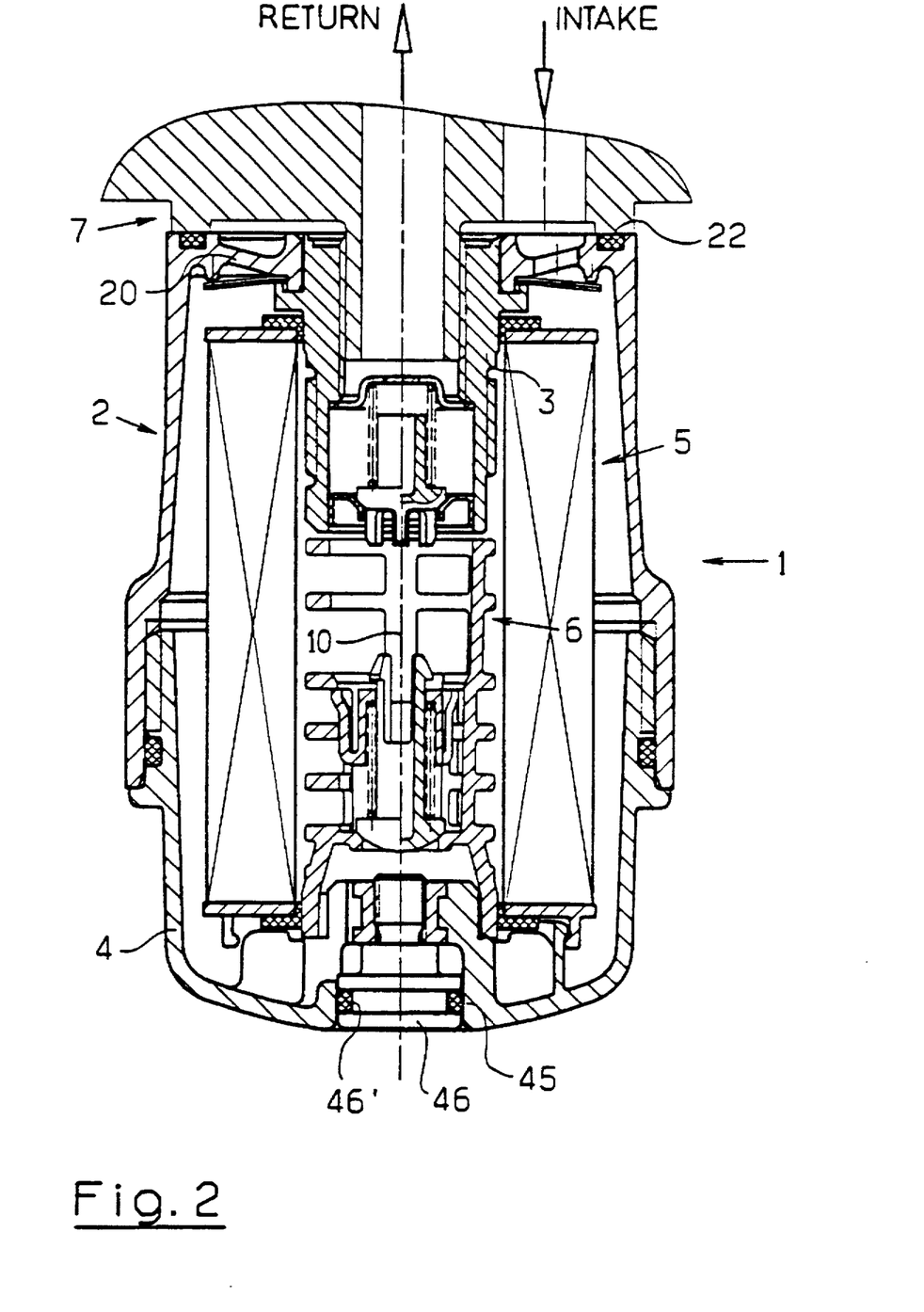
FIG. 2 is a longitudinal section view of a liquid filter shown in a vertical, hanging installed attitude.

FIG. 2 of the drawing shows an exemplary embodiment of the liquid filter 1 in a hanging installed attitude with a vertical axis 10. Given this liquid filter 1, the face wall 20 lies at the top and is again braced in sealing fashion against the filter connecting flanges 7 by the central fastening screw 3 upon interposition of the seal ring 22. The circumferential wall 24 of the filter housing 2 extends downward of one piece from the face wall 20, whereby the open side of the filter housing 2 here is again closed with the cover 4. The filter insert 5 may again be seen in the inside of the filter housing 2, the supporting member 6 lying in the interior of this filter insert 5.

Differing from the exemplary embodiments set forth above with reference to FIG. 1, no drain opening whatsoever is provided in the circumferential wall 24 given the liquid filter 1 of FIG. 2; instead, a drain opening 45 is provided in the cover 4 in this exemplary embodiment, being provided in the middle region thereof which represents the lowest point of the liquid filter 1 in the installed condition. This drain opening 45 is closed liquid-tight by a screw 46 upon interposition of seal ring 46' during normal operation of the liquid filter 1.

For draining the liquid filter 1, the screw 46 must then merely be screwed out of the cover 4, whereupon a controlled draining of the liquid situated in the liquid filter 1 is enabled. After the filter 1 has been emptied, the cover 4 can be screwed off, whereby the supporting member 6 and the filter insert 5 together with the cover 4 are again removed from the filter housing 2 here as a unit.

In terms of its other features and properties, the liquid filter 1 according to FIG. 2 corresponds to the example in FIG. 1.

Figure 3:
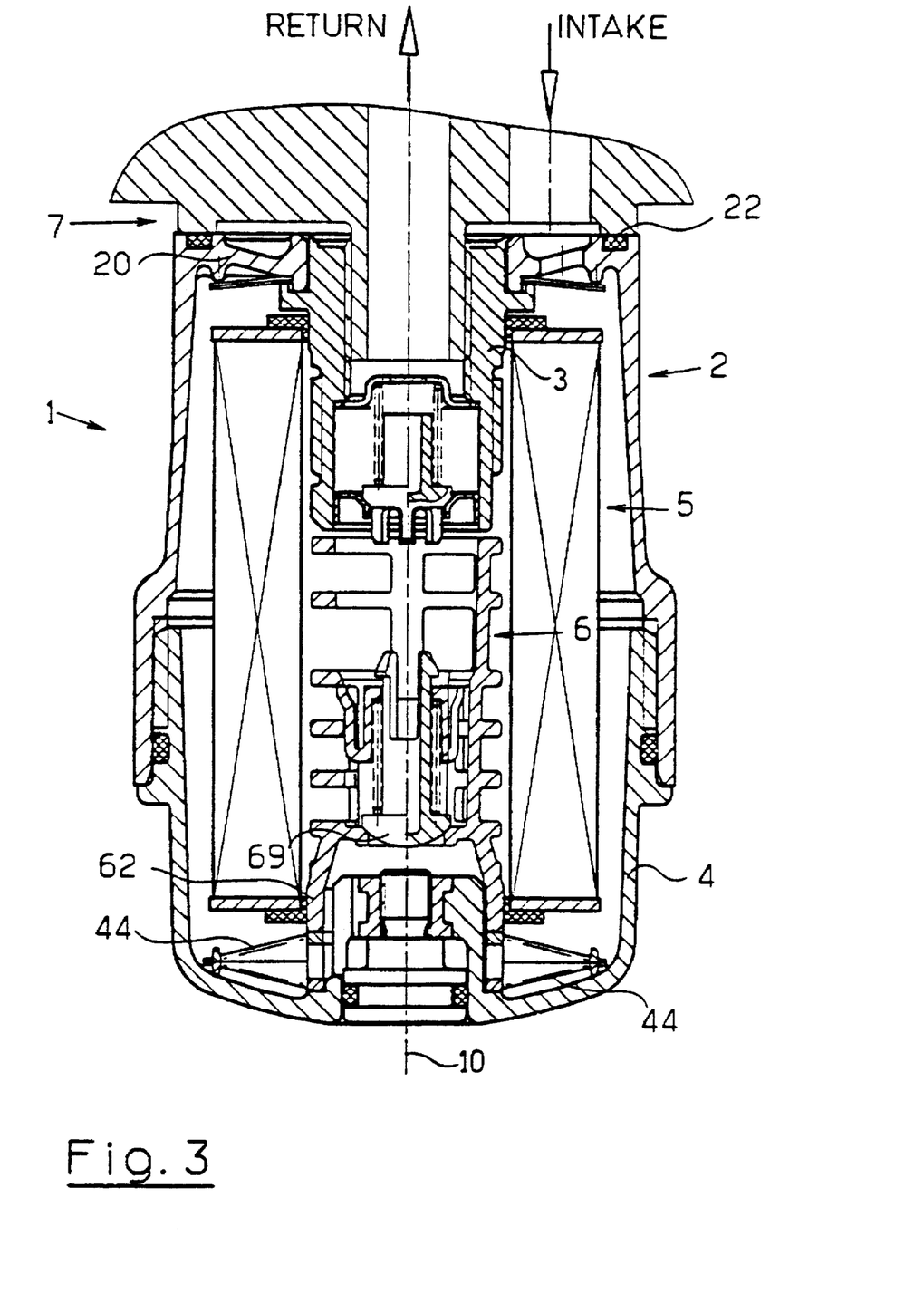
FIG. 3 is a longitudinal section view of the liquid filter of FIG. 2 having an additional bypass filter element.

FIG. 3 of the drawing shows an exemplary embodiment of the liquid filter 1 that corresponds to the farthest-reaching extent to that of FIG. 2. In this liquid filter 1 of FIG. 3, a bypass filter element 44 is additionally provided at the inside of the cover 4, this bypass filter element 44 serving the purpose of assuring a minimum filtering of the liquid in case of a blockage of the filter insert 5 when the bypass valve 69 opens. The bypass filter element 44 is arranged in clamping or latching fashion between the inside of the cover 4 and what is the lower face end of the supporting member 6 and thus forms a part of the unit composed of cover 4, supporting member 6 and filter insert 5. When the bypass filter element 44 is also to be replaced, the supporting member 6 must merely be pulled off from the cover after the cover 4 has been unscrewed and the filter insert 5 has been removed, whereupon the bypass filter element 44 can also be separated from the cover 4 in the longitudinal direction 10 thereof. Assembly then ensues in the reverse sequence.

Figure 4:
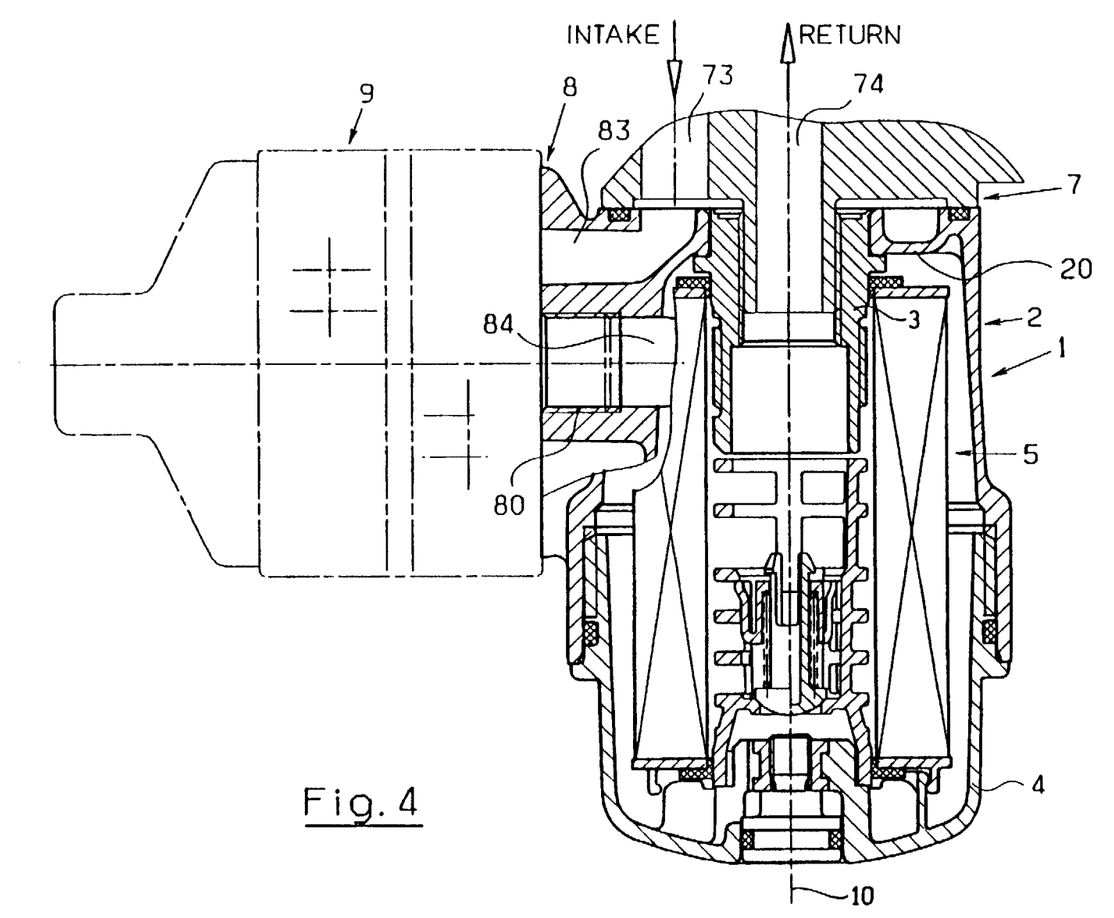
FIG. 4 is a longitudinal section view of the liquid filter of FIG. 2 having a heat exchanger additionally flanged thereto.

FIG. 4 of the drawing shows an exemplary embodiment of the liquid filter 1 that again simply corresponds to that of FIG. 2. Given this liquid filter 1, a heat exchanger connecting flange 8 is additionally provided at the left-hand, upper side of the filter housing 2 in FIG. 4, this heat exchanger connecting flange 8 serving the purpose of screwing on a heat exchanger 9 indicated with broken lines on the basis of a threaded arbor 80 provided thereat. For guiding the liquid to the heat exchanger 9 and from the latter back to the liquid filter 1, an intake channel 83 and a discharge channel 84 are fashioned in the inside of the liquid filter 1. The intake channel 83 leads from the intake channel 73 of the filter connecting flange 7 to the admission side of the heat exchanger 9; the discharge channel 84 leads from the discharge side of the heat exchanger 9 to the outside circumference of the filter insert 5 into the interior of the filter housing 2.

Here, too a fastening screw 3 that can be turned relative to the filter housing 2 offers the possibility of positioning the heat exchanger 9 that projects in radial direction from the filter housing 2 in any desired position as viewed in circumferential direction of the liquid filter 1.

Figure 5:
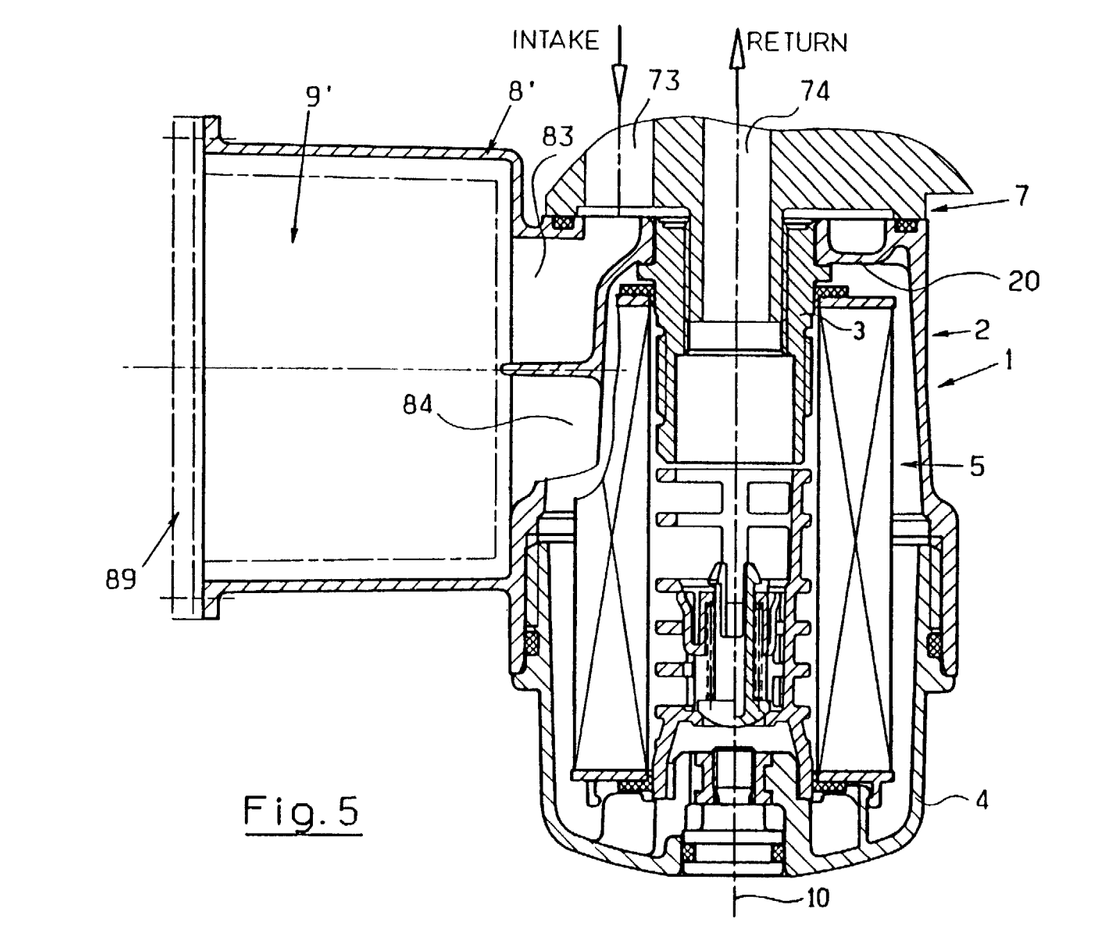
FIG. 5 is a longitudinal section view of a second embodiment of the liquid filter having a heat exchanger.

FIG. 5 of the drawing, finally, shows a liquid filter 1 that represents an alternative to the embodiment of FIG. 4. Given the liquid filter 1 of FIG. 5, a heat exchanger housing 8' is provided of one piece with the filter housing 2, this housing 8' serving the purpose of accepting a heat exchanger 9'. The heat exchanger housing 8' can be closed liquid-tight with a cover 89.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. In a liquid filter comprising a filter housing having a face wall with at least one liquid intake and at least one liquid return channel extending therethrough, a releasable cover that closes the filter housing liquid-tight, an individually replaceable filter insert that can be removed from the filter housing, and a seal member positioned between said filter housing and a filter connecting flange, the improvement comprising an aperture extending through said face wall, a hollow fastening screw extending through said aperture that forms said liquid return channel and includes a flange and a collar non-removably capturing said screw at said housing face wall without threads, wherein said flange and said collar are engaged with exterior and interior surfaces of said face wall, respectively, to permit rotation of said screw relative to said housing while preventing removal of said screw from said aperture.

2. A liquid filter according to claim 1, wherein the fastening screw and the face wall of the filter housing have parts positioned in an interfering relationship to hold the fastening screw in captive fashion in the face wall of the filter housing.

3. A liquid filter according to claim 1, wherein the fastening screw comprises at least one of an inside and outside polygon as a screwing tool dog point at a free end thereof directed toward the cover.

4. A liquid filter according to claim 1, wherein an annular channel for the acceptance of said seal member in the form of a seal ring is provided radially outward of the fastening screw in a surface of the face wall of the filter housing directed toward the filter connecting flange, whereby the seal ring projects from the channel in axial direction of the filter housing in a relaxed condition of said seal ring, and whereby the seal ring lies completely inside the annular channel with elastic deformation in the mounted condition of the liquid filter.

5. A liquid filter according to claim 1, wherein a liquid drain opening for draining the filter housing that is closed during operation and can be released as needed is provided at at least one of a circumferential side in the filter housing, a circumferential side of the cover and a free end face side of the cover.

6. A liquid filter according to claim 5, wherein the liquid drain opening is formed by a passage closed with a releasable screw.

7. A liquid filter according to claim 1, wherein a check valve is arranged in the axial liquid channel in the fastening screw.

8. A liquid filter according to claim 1, wherein a check diaphragm is provided in the filter housing at the liquid intake channel of the filter housing.

9. A liquid filter according to claim 8, wherein the check diaphragm is flexibly and annularly fashioned and is held at its radially inside edge between the face wall and a collar provided at the fastening screw.

10. A liquid filter according to claim 1, wherein the fastening screw projects into the filter housing at least over a part of the axial length of said filter housing and comprises supporting elements at its outer circumference for a fold support at the inside circumference of a hollow-cylindrical star-shaped filter insert folded zigzag-shaped that is arranged as a filter insert in the filter housing.

11. A liquid filter according to claim 1, wherein the cover is connected to a supporting member aligning with the fastening screw, for a fold support at the inside circumference of a hollow-cylindrical star-shaped filter insert folded zigzag-shaped that is arranged in the filter housing as a filter insert.

12. A liquid filter according to claim 11, wherein a bypass valve is provided in the supporting member forming a direct flow path from a crude side to a clean side while bypassing the filter insert, said flow path being formed through said bypass valve when a prescribable pressure differential between a crude side and clean side of the liquid filter is exceeded.

13. A liquid filter according to claim 12, wherein a bypass filter element is arranged in the course of the direct flow path from the crude side to the clean side.

14. A liquid filter according to claim 1, wherein the cover and the filter insert are equipped with catch connector means that can be brought into engagement with one another, being equipped therewith such that the filter insert is removed from the housing by the cover when the cover is taken off from the filter housing.

15. A liquid filter according to claim 1, wherein the filter housing comprises liquid channels and a connecting flange for a heat exchanger through which the liquid to be filtered or the filtered liquid can flow and which is attached via a flange to the filter housing directed in radial direction thereof.

16. A liquid filter comprising:

a filter housing having at least one liquid intake channel and at least one liquid return channel passing through a face wall of the filter housing that faces toward a filter connecting flange to which said filter housing is to be mounted, an aperture extending through said face wall, a releasable cover that closes the filter housing liquid-tight, an individually replaceable filter insert that can removed from the filter housing, and a hollow fastening screw extend through said aperture and forming said liquid return channel in communication with said liquid return channel, said screw including a flange and a collar engaged with exterior and interior surfaces of said face wall, respectively, to permit rotation of said screw relative to said housing while preventing removal of said screw from said aperture, said screw serving to securely mount said filter housing to the filter connecting flange.

17. A liquid filter according to claim 16, wherein a liquid drain opening for draining the filter housing that is closed during operation and can be released as needed is provided at at least one of a circumferential side in the filter housing, a circumferential side of the cover and a free end face side of the cover.

18. A liquid filter according to claim 16, wherein a check valve is arranged in said axial liquid channel in said fastening screw.

19. A liquid filter according to claim 16, wherein a check diaphragm is provided in said filter housing at said liquid intake channel.

* * * * *

UNITED STATES PATENT AND TRADEMARK OFFICE
CERTIFICATE OF CORRECTION

PATENT NO. : 5,538,626
DATED      : July 23, 1996
INVENTOR(S): Dieter Baumann

It is certified that error appears in the above-indentified patent and that said Letters Patent is hereby corrected as shown below:

Column 1, line 20 should read --about-- and not "a bout"

Column 12, line 12 should read --extending-- instead of "extend"

Signed and Sealed this

Twenty-fifth Day of March, 1997

Attest:

BRUCE LEHMAN

Attesting Officer

Commissioner of Patents and Trademarks